April 21, 1953  J. NISENSON  2,635,529
COOKING DEVICE
Filed July 29, 1946  3 Sheets-Sheet 1

JULES NISENSON
INVENTOR.
BY Richard S. Temko
attorney

JULES NISENSON
INVENTOR.

Patented Apr. 21, 1953

2,635,529

UNITED STATES PATENT OFFICE 2,635,529

COOKING DEVICE

Jules Nisenson, New York, N. Y.

Application July 29, 1946, Serial No. 686,848

2 Claims. (Cl. 99—421)

This invention relates generally to cooking devices and more particularly to such wherein the cooking is performed within an enclosed casing of portable character.

It is among the objects of the present invention to provide a cooking device in which the article being cooked may be subjected to heat from above the same so that molten fat and drippings may fall from the article being cooked by the action of gravity upon a collector therebeneath.

Another object herein lies in the provision of a cooking device wherein the article being cooked may be rotated in proximity to the heat source so as to produce a uniform cooking effect.

Another object herein lies in the provision of a device of the class described wherein the article to be cooked may be impaled upon a skewer which may be used to transport said article to and from the cooking device and which may be automatically engaged with skewer rotating means on the device.

Another object herein lies in the provision of a device of the character described in which the article being cooked may be viewed during the cooking process and yet the fumes are confined within the device.

A feature of the device lies in the fact that the cover element may be shifted in position for a number of purposes including the insertion and withdrawal of the article being cooked, change in the proximity of the heat source with respect to said article, and the venting of steam and other volatile materials produced during the cooking process. Furthermore, the cover element may be locked in position so as to properly support the handle by which the device may be carried or positioned.

Another object herein lies in the provision of a cooking device having a shiftable cover element wherein the cover may be shifted from open to closed positions without being inverted so as to expose the heat source to burn the operator.

Another object herein lies in the provision of a cooking device wherein the cover element carries thereon bearing portions which are adapted to coact with complementary bearing portions on the end casing elements to properly position and rotatably support the skewer element and maintain said element in engagement with the main driving element.

A still further object lies in the provision of a device of the character described which is relatively simple and foolproof in construction so that it may be manufactured in large scale at low cost to have a consequent wide distribution and use.

These objects and other incidental ends and advantages will more fully appear in the progress of this disclosure and be pointed out in the appended claims.

In the drawings in which similar reference characters designate corresponding parts throughout the several views.

Figure 1:
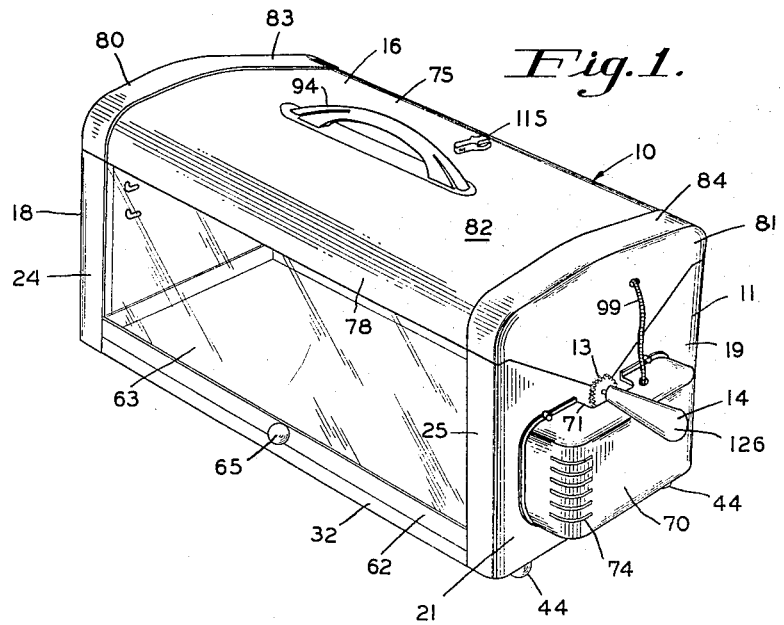
Figure 1 is a view in perspective showing an embodiment of the invention.

In accordance with the invention, the cooking device generally indicated by reference character 10 comprises broadly a body 11, a main driving element 12, a skewer rotating means 13, a skewer element 14, an auxiliary skewer 15, a cover element 16, and a heating element 17.

The body 11 includes end casing elements 18 and 19 which are preferably cast of metal although they may be otherwise fabricated. The end casing elements are substantially identical except that one may be considered a left hand element and the other a right hand one. The end casing elements 18 and 19 have outer vertical surfaces 20 and 21, inner vertical surfaces 22 and 23, front walls 24 and 25, rear walls 26 and 27, and upper edges 30 and 31 respectively. The inner walls 22 and 23 are provided with a plurality of opposed pairs of grid supports 34—39 (shown on Figure 3). The supports on the inner surface 23 do not appear in the drawings but they are placed to correspond to the position of the supports upon the surface 22 so that the grid 40 may be placed at a series of different levels with respect to the heating element 17, when the grid is used.

The end casing elements 18 and 19 are maintained in position with respect to each other by the base 28 which has depending front and rear longitudinal flanges 32 and 33 and the tie bars 41 and 42. The base plate 28 is secured to the lower surfaces of the end casing elements by a plurality of threaded studs 43 which secure the feet 44 in place. The tie bars 41 and 42 at each end thereof are secured to the respective front and rear walls of the end casing elements in any suitable manner. Thus, the bar 41 is secured to the front wall 24 by the screw 45, the right hand end of said bar not being shown; while the left end of the bar 42 is secured to the rear wall 26 by the screw 46 and the right end of said bar is secured to the rear wall 27 by the screw 47.

Upper edges 30 and 31 of the end casing elements 18 and 19 are provided with downwardly converging edge guides 48, 49 and 50, 51. At the lowermost portions of the guide edges 48 and 49 they are joined by a bearing portion 52, while at the lowermost portions of the guide edges 50 and 51 they are joined by a bearing portion 53. The bearing portions 52 and 53 combine with the bearing portions 54 and 55 respectively to form journals for the skewer member 56.

Figure 3:
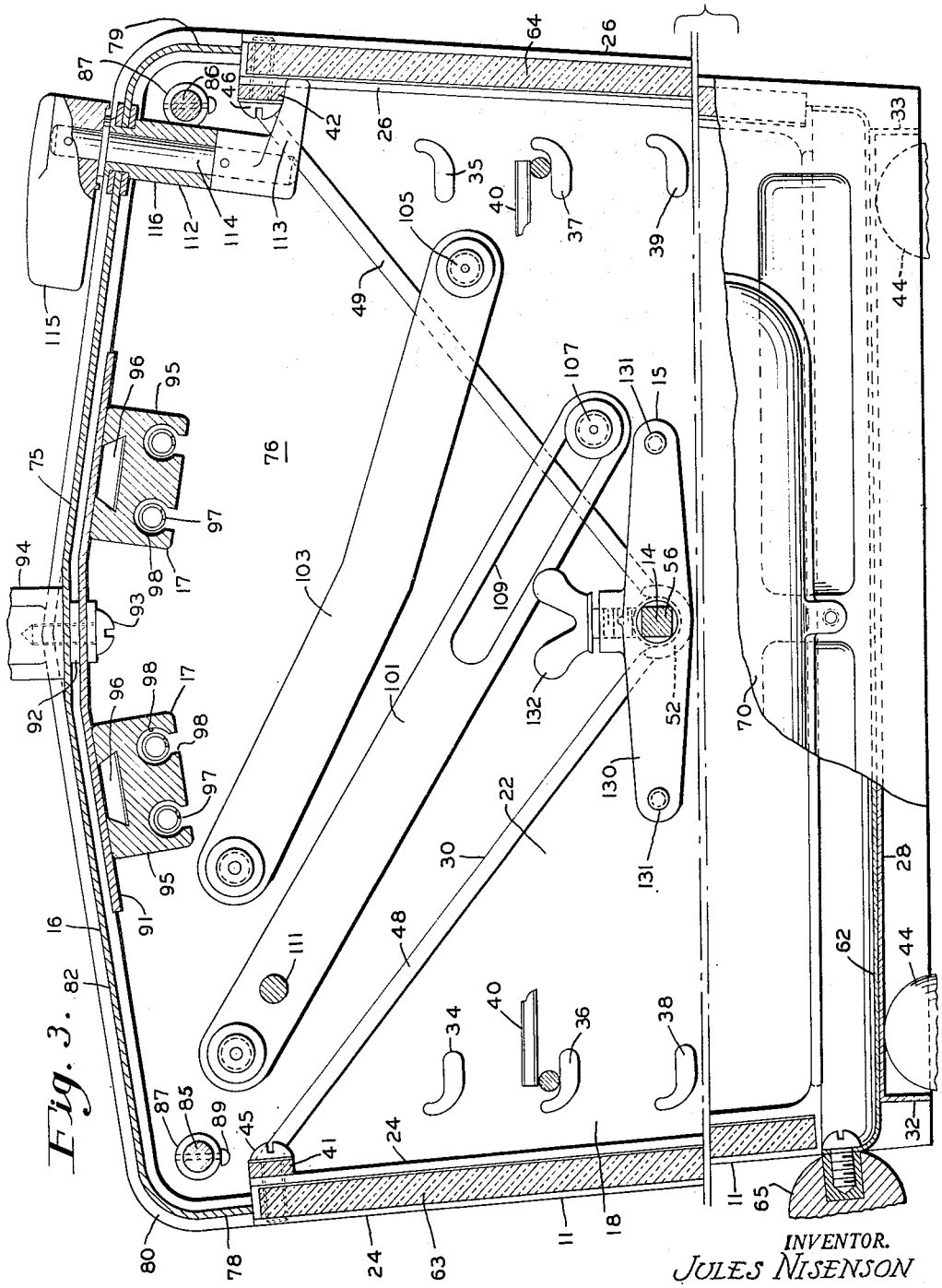
Figure 3 is an enlarged vertical transverse fragmentary sectional view, partly in elevation, of the device shown in Figure 1.

Extending inwardly from the lower portions of the inner walls 22 and 23 are projections 57 and 58 which may be hollow where desired as at 59. The projections 57 and 58 have inwardly extending beads 60 and 61 adapted to prevent the collector 62 from tilting as it is extracted. The collector 62 is preferably oblong in shape and is slidably disposed upon the base plate 28 between the projections 57 and 58 so that the same may be withdrawn in a direction forwardly of the device for removing drippings from the article (not shown) being cooked. The front walls 24 and 25 and the rear walls 26 and 27 have vertically arranged grooves in the inner edges thereof within which are disposed the transparent plates 63 and 64. The plates 63 and 64 may be slid upwardly out of said grooves for the purpose of removing the same to clean them. As best seen in Figure 3, the lower ends of the grooves, in the front and rear walls 24—27 terminate above the level of the collector 62 so that they do not interfere with the movement of the collector when such movement is desired. The collector 62 may be moved to the left as seen in Figure 3 by grasping the handle 65. The collector 62 has only relatively shallow vertical walls surrounding the same but by virtue of the large area over which it extends it may collect a substantial amount of gravy from cooking articles such as beef or fowl.

The main driving element 12 may take the form of an electric motor carried by a support plate 66 which may be secured to the end casing element 19. The mounting of the plate 66 upon the element 19 may be accomplished in a manner to reduce the transmission of noise to said casing element as by the use of resilient washers (see the washer 67). The drive to the pinion or first engaging element 68 from the motor 12 may be through suitable gear reduction means not shown. The pinion 68 mounted upon a shaft 69 is positioned below the bearing portion 53 and outwardly thereof. The motor, speed reduction means, and the pinion 68 are enclosed in a casing 70, the upper wall of which is provided with an indentation or opening 71 through which the pinion 68 may be reached. The motor 12 may receive electrical energy from a well known cord and plug. The casing 70 may be detachably secured to the outer surface 21 in any suitable manner as by the screws 72 and 73. Motor ventilation is provided through the slots 74.

The cover element 16 includes cover end elements 80 and 81 and a cover central element 82. The element 82 includes a top wall 75, a front wall 78, and a rear wall 79. The cover end elements 80 and 81 have inwardly directed flanges 83 and 84 and end walls 76 and 77. The flanges 83 and 84 are provided with inwardly opening grooves within which the left and right edges of the central element are engaged. The end elements 80 and 81 are maintained in position with respect to each other by front and rear tie rods 85 and 86 which are anchored in hollow bosses 87 and 88 by means of pins 89 and 90. The top wall 75 slopes downwardly in forward and rear directions from the central longitudinal axis thereof. Disposed below the top wall 75 is the reflector mounting plate 91 which is shaped generally to conform to the lower surface of the top wall and is spaced therefrom by the washers 92 which are mounted upon the screws 93, said screws serving not only to position the reflector 91 but also to attach the handle 94. The insulating supports 95 may be composed of ceramic material and may be secured to the reflector 91 in any suitable manner, as for example, by dovetail lugs 96 engaging correspondingly shaped depressions in the upper surfaces of the supports 95. Coils of resistance wire 97 may be loosely restrained within the upwardly extending slots 98 in the supports 95. The coils 97 are connected to the source of electrical energy by conductors, not shown, thence through the armored cable 99. Where desired, thermostatic means, not shown, may be employed to control the temperature within the device.

Figure 2:
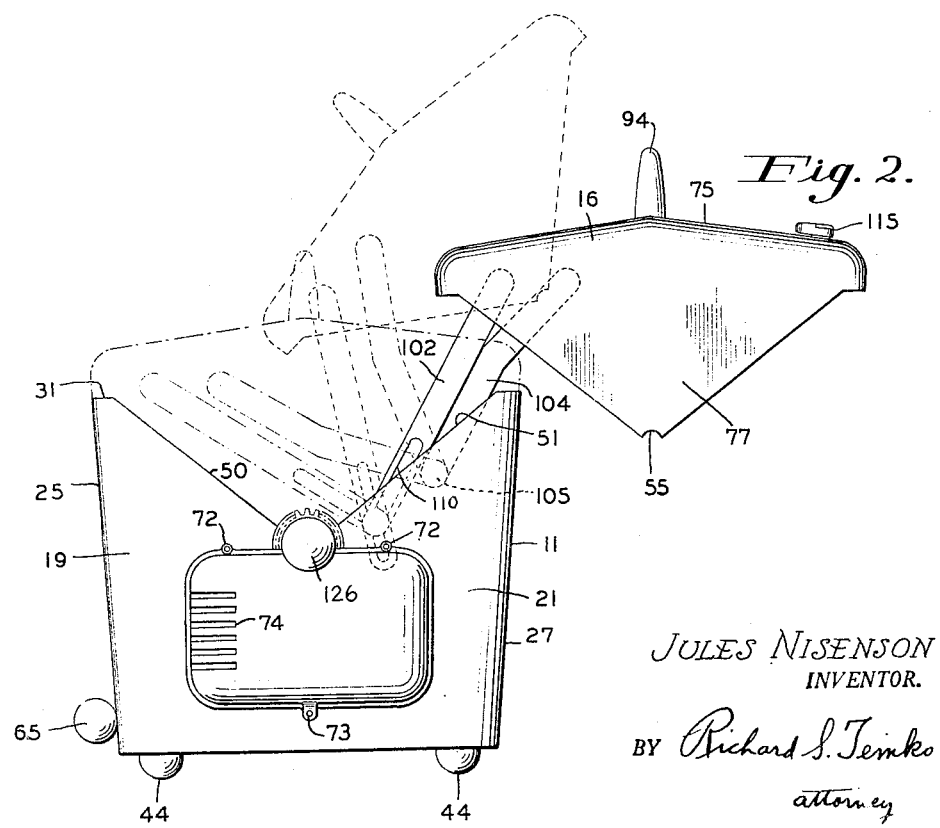
Figure 2 is a right hand end elevational view of the device shown in Figure 1 with the cover element in an extended position thereof.
Figure 4:
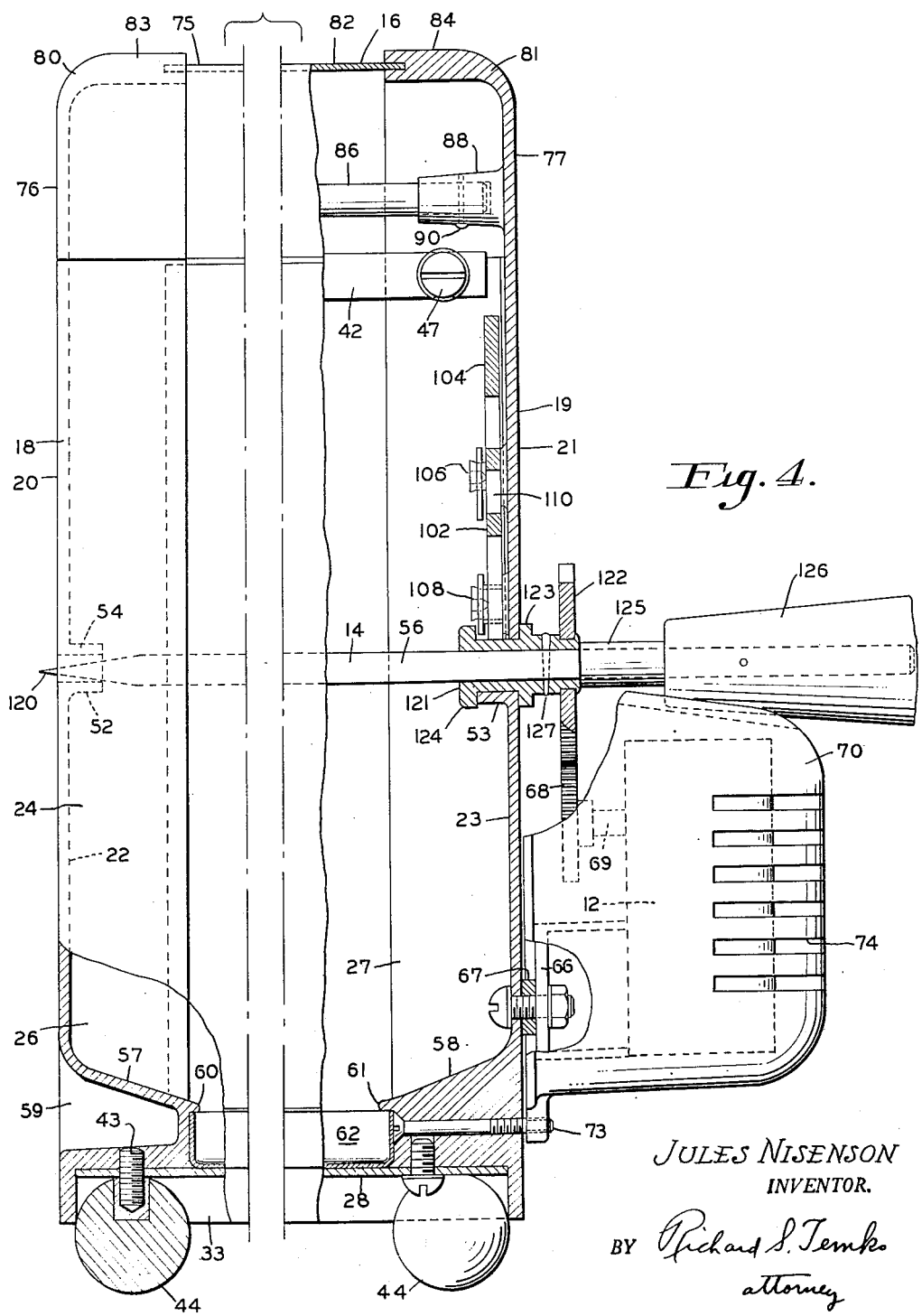
Figure 4 is an enlarged vertical longitudinal fragmentary sectional view, partly in elevation, of the device shown in Figure 1.

The cover element 16 is shiftable as a unit with respect to the body 11 so that in the closed position thereof it may lie as shown in Figures 1, 3 and 4 and in the opened position thereof as shown in Figure 2. The cover element 16 is connected to the body 11 by the front levers 101, 102, and the rear levers 103, 104. The levers 103 and 104 are pivotally connected at the upper ends thereof to the inner surfaces of the end walls 76 and 77 and at the lower ends thereof by the pivots 105 and 106. The levers 103 and 104 are bent substantially in the middle thereof so that the upper portions of said levers form an obtuse angle with the lower portions thereof. The levers 101 and 102 are substantially rectilinear and at the upper ends thereof are pivotally connected to the inner surfaces of the end walls 76 and 77 and at the lower ends thereof are slidably and pivotally connected to the inner surfaces 22 and 23 respectively by the studs 107 and 108. The lower portions of the levers 101 and 102 are provided with elongated slots 109 and 110 which ride upon the studs 107 and 108. The upper portions of the levers 101 and 102 are connected by a tie rod 111. As best seen in Figure 2, when the cover element 16 is in the closed position it lies as shown by the dash-dot lines in said figure. As the cover element 16 is moved upwardly and rearwardly toward its open position, the levers 101 and 102 move downwardly upon the studs 107 and 108 to take the position shown by the dotted lines in said figure. In the fully opened position thereof, the levers 103 and 104 have the lower portions thereof abutting against the rod 85 while the levers 101 and 102 abut against the then forward surfaces of the levers 103 and 104. At the same time, the levers 101 and 102 rise so that the studs 107 and 108 abut the lower ends of the slots 109 and 110. In the open position thereof, the cover element 16 lies in a plane generally parallel to and elevated above the plane it occupies in its closed position.

A latch 112, best seen in Figure 3, includes a latching finger 113, an axle 114 and an operating handle 115. The latch 112 is rotatably mounted for movement about a generally vertical axis in a sleeve 116 mounted in an opening in the top wall 75. When the latch is in its closed position as shown in Figure 3, the finger 113 becomes engaged below the tie bar 42 to prevent the cover from being elevated. When so latched, the handle 94 may be used to carry the device 10 without the device opening.

The skewer element 14 includes an elongated skewer member 56 having a point 120, a collar 121 with a gear or second engaging element 122, with outer and inner flanges 123 and 124, a ferrule 125 and a handle 126. The skewer element is preferably formed by taking a long piece of stock which is non-circular (shown square) in cross section and mounting the parts thereon. The handle 126 may be provided with a square opening so that it is non-rotatable with respect to the core. Similarly, the collar 121 may have a non-circular bore and may be secured in place by the pin 127.

In use the article to be cooked is impaled upon the skewer member 56 and the skewer element 14 is seated upon the lower bearing portions 52 and 53. This also is facilitated by the fact that the mere laying of the collar 121 between the flanges 123 and 124 upon the edge guide 50 or 51 will result, under the action of gravity, in the skewer element 14 becoming properly placed so that the gear 122 meshes with the pinion 68. The loading operation is of course performed with the cover element 16 in the opening position thereof. If the main driving element 12 and the heat source 97 are now energized by the closing of a suitable switch in series with the source of electrical energy, said switch not being shown, the skewer element 14 together with the article thereon, will commence to revolve. The cover element may now be brought into its closed position, which it takes under the action of gravity after it has passed a dead center position so that the upper bearing portions 54 and 55 may engage the skewer element. In an alternate construction the levers 101—104 may have relatively tight frictional fits on the studs upon which they are mounted so that the cover element may be maintained in adjusted positions above the fully seated position. This permits a portion of the vapors generated in the cooking process to be released and also affects the temperature so that different cooking effects may be obtained.

Where the articles which it is desired to cook, are of such soft texture so that by inertia they tend to remain stationary because of insufficient connection between the orifice formed therein and the skewer member 56, or where the articles are of unusual shape, as for example, chops, the auxiliary skewer 15 may be used. This is shown in Figure 3 and comprises a cross head 130 with a plurality of auxiliary skewer members 131 extending at right angles thereto so that said auxiliary skewer members may lie spaced and parallel with respect to the skewer member 56. The cross head 130 may be locked at any desired position along the skewer member 56 by the set screw 132 which engages the skewer member 56.

As described above, when it is desired to cook without rotation of the article being cooked, the skewer element 14 may be removed entirely and the rack or grid 40 substituted. By positioning the rack 40 at different levels upon the opposed sides of the grid supports 34—40, the position of the article with respect to the heating elements 97 may be adjusted.

It may thus be seen that I have disclosed a useful cooking device in which the articles being cooked are evenly subjected to heat and in which the heat is applied from above so that desired broiling and other cooking effects may be obtained. The loading or unloading of the articles to be cooked by impaling them upon the skewer element is quickly and easily performed and the engagement of the skewer element with the driving means for rotational purposes is substantially automatic after the skewer has been placed upon the guide means provided. The degree of cooking obtained may be readily inspected through the transparent panes disposed at the front and rear of the device. The device is highly portable by virtue of the fact that the cover may be locked in a closed position thereof, and the handle manipulating cover may be used as a carrying handle for the device.

I wish it to be understood that I do not desire to be limited to the exact details of construction shown and described for obvious modifications will occur to a person skilled in the art.

I claim:

1. A portable cooking device comprising a body having a pair of spaced end walls and front and rear walls joining said end walls, each of said end walls having an upper edge with a substantially deep V-shaped indentation therein extending between the front and rear walls of the body, driving means associated with said body and having a first interengaging element connected thereto, said first interengaging element being positioned in proximity to the lowest part of the indentation in one of said end walls, a skewer element, a second interengaging element connected to said skewer element, said skewer element being of a length at least equal to the distance between said end walls, a shiftable cover having end walls, each of said cover end walls having a depending V-shaped flange adapted to be seated in the V-shaped indentation of the body end wall, the apex of said body end wall V-shaped indentation being enlarged and downwardly rounded to form a bearing portion, said depending flange having an upwardly rounded bearing portion at the lowermost point thereof, linkage means extendable between the cover end walls and the respective body end walls to support the cover in its raised position, and means for locking the cover in its closed position to the body, whereby when said skewer element is placed within said V-shaped indentation, it will under the action of gravity be guided into the rounded apices of the V-shaped indentations, in which position the second interengaging element may contact the first interengaging element, and the skewer element will be retained therein by the bearing portions of the depending flanges of the respective cover end walls.

2. A portable cooking device, as defined in claim 1, said body front and rear walls having vertically extending opposing grooves, transparent plates respectively removably disposed in the front and rear wall grooves, said shiftable cover extending over the top edges of the transparent plates to confine the same within said grooves when the cover is in its closed position, said flanges of the cover end walls when fitted in the V-shaped indentations of the body end walls thereby restraining said cover against front and rear displacement from the top edges of said transparent plates, said linkage means permitting the cover to be shifted to its raised position and free of the rear transparent plate to permit the removal of the transparent plates from the body front and rear wall grooves.

JULES NISENSON.

(References on following page)

References Cited in the file of this patent

UNITED STATES PATENTS

| Number | Name | Date |
|---|---|---|
| 843,191 | Allen | Feb. 5, 1907 |
| 999,207 | Clark | Aug. 1, 1911 |
| 1,009,842 | Jones | Nov. 28, 1911 |
| 1,029,047 | Calver | June 11, 1912 |
| 1,059,221 | Saylor | Apr. 15, 1913 |
| 1,085,671 | Day | Feb. 3, 1914 |
| 1,230,316 | Napier | June 19, 1917 |
| 1,442,584 | Schey | Jan. 16, 1923 |
| 1,541,472 | Born | June 9, 1925 |
| 2,012,811 | Duffy | Aug. 27, 1935 |
| 2,096,726 | Barton | Oct. 26, 1937 |
| 2,182,225 | Garvis | Dec. 5, 1939 |
| 2,211,024 | Nardin | Aug. 13, 1940 |
| 2,263,715 | Bobo | Nov. 25, 1941 |
| 2,349,617 | Gorman | May 23, 1944 |
| 2,379,239 | Krebs | June 26, 1945 |
| 2,399,163 | Brunamonti | Apr. 30, 1946 |
| 2,494,448 | Nassif | Jan. 10, 1950 |
| 2,502,685 | Warner | Apr. 4, 1950 |

FOREIGN PATENTS

| Number | Country | Date |
|---|---|---|
| 148,383 | Austria | Jan. 11, 1937 |